Figure 1:
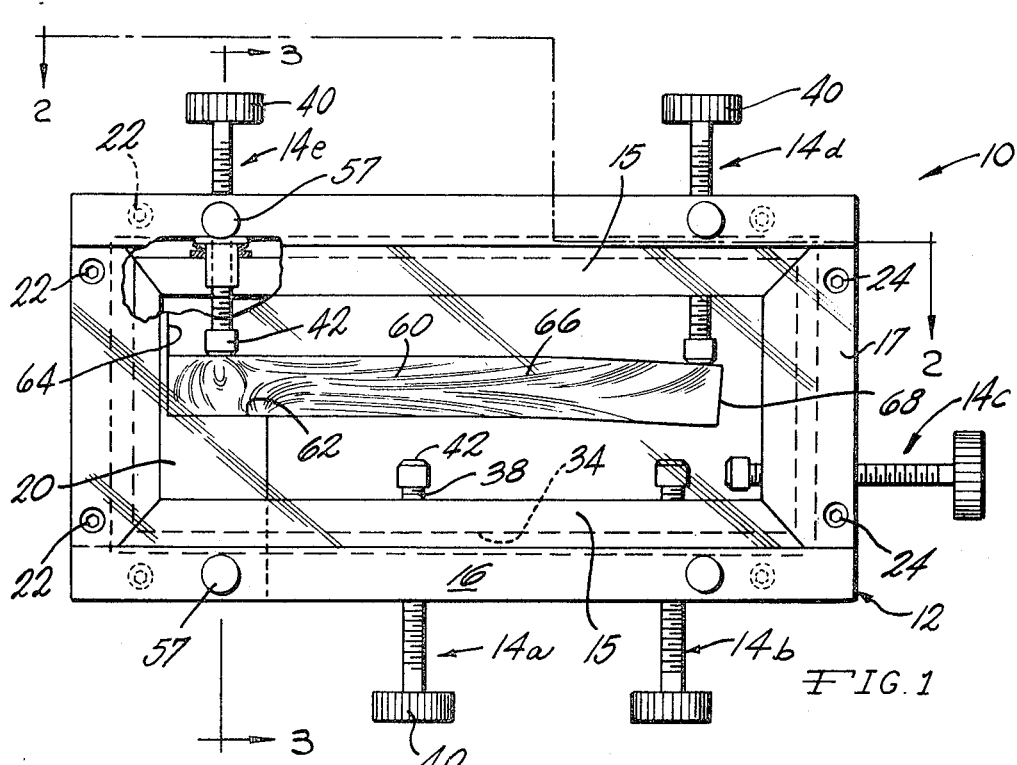

United States Patent
Perry

[15] 3,651,584
[45] Mar. 28, 1972

[54] APPARATUS FOR VISUALLY DEMONSTRATING STRESS PATTERNS IN A PHOTOELASTIC MODEL

[72] Inventor: Charles C. Perry, Ann Arbor, Mich.
[73] Assignee: Vishay Intertechnology, Inc., Malvern, Pa.
[22] Filed: May 27, 1970
[21] Appl. No.: 41,015

[52] U.S. Cl. .............................................35/19 R, 356/33
[51] Int. Cl. ..............................................G09b 23/06
[58] Field of Search................35/49, 19 R, 19 B; 356/33, 356/34, 35; 73/103

[56] References Cited

UNITED STATES PATENTS 2,096,964  10/1937  Frocht......................................356/33
3,293,908  12/1966  Chapman..................................356/33
3,373,652  3/1968   Flader.......................................356/33

OTHER PUBLICATIONS

Stansi Scientific Division Catalog Rec' d Feb. 1969 page 259 only

Primary Examiner—Harland S. Skogquist
Attorney—Olsen and Stephenson

[57] ABSTRACT

Apparatus consisting of a frame in which a photoelastic model of a structural member is mounted in a floating position and a plurality of separately actuatable load applying members are movably mounted on the frame for applying various loads to the model to visually demonstrate various stress patterns in the model corresponding to the various loads applied thereto.

7 Claims, 4 Drawing Figures

INVENTOR
CHARLES C. PERRY

BY Olsen and Stephenson
ATTORNEYS

APPARATUS FOR VISUALLY DEMONSTRATING STRESS PATTERNS IN A PHOTOELASTIC MODEL

BACKGROUND OF THE INVENTION

Photoelasticity is well known as a technique for stress and strain analysis. The photoelastic method is based upon a unique property of some transparent materials, particularly certain plastics, that enables the use of structural members made of such materials to visually display stress patterns in the member. When a plane photoelastic member is stressed, and a ray of plane polarized light enters the member, the light is divided into two component waves, each with its plane of polarization parallel to one of the principal planes of stress and strain. Furthermore, the light travels along these two planes with different velocities depending upon the magnitudes of the principal stresses in the material. Thus, light waves emerge from the model in the two planes with a phase difference so that when these waves are brought together at a plane polarizing panel, which functions to bring the waves into a common plane so that optical interference can take place, the resulting optical interference shows up as dark and light bands on the model. To eliminate the presence of isoclinic fringes quarter wave retardation plates are provided in conjunction with the plane polarizing panels. This combination is conventionally referred to as a circular polarizer and when two spaced circular polarizers are used, the combination constitutes a circular polariscope. When a stressed transparent photoelastic model is placed in a circular polariscope a pattern of colored bands or isochromatic fringes appear. This band or fringe pattern can be measured and interpreted to determine actual stresses and strains in the model.

Heretofore, apparatus for utilizing the photoelastic technique has been limited to precision equipment capable of quantitatively analyzing isochromatic patterns. Such equipment is, of necessity, prohibitively expensive for classroom demonstration purposes and is of a size which does not readily lend itself to these purposes. Accordingly, the principal object of the present invention is to provide simple and compact apparatus capable of utilizing the photoelastic method to visually demonstrate stress patterns in a structural member and which is also versatile in use to demonstrate a variety of different stress patterns resulting from different loads on various structural members.

SUMMARY OF THE INVENTION

The apparatus of this invention includes a frame of a size that can readily be held in the hand and consisting of a pair of plates which are arranged side by side in parallel planes and are connected together so as to form a space between the plates. Aligned rectangular window openings are provided in the plates, and the plates are grooved so as to form an inside track on the frame extending around the periphery of the window openings. A photoelastic structural member is mounted between the plates so that it is viewable through either window opening and light polarizing panels are mounted on the frame so as to overlie the windows. Nuts are slidably mounted in the track and screws are threadably mounted in the nuts for advancement therethrough into engagement with the structural member. Each screw forms a part of a load applying unit which is engageable with the structural member, two or more of the units cooperating at any given time to maintain the structural member in a fixed loaded position between the windows. The screws are provided with enlarged heads which can be used as supports for the frame, in the event support of the frame on a table or the like is desired, and the load applying units can be manipulated in a wide variety of sequences so as to subject the member to a variety of loads. Each time the structural member is loaded, the stress pattern in the structural member is viewable through one of the panels as an isochromatic pattern representative of the stress pattern in the structural member. Thus, the load applying units can be used in a large number of different ways with a large number of different models to visually demonstrate differing stress patterns for classroom and similar demonstration purposes.

Figure 2:
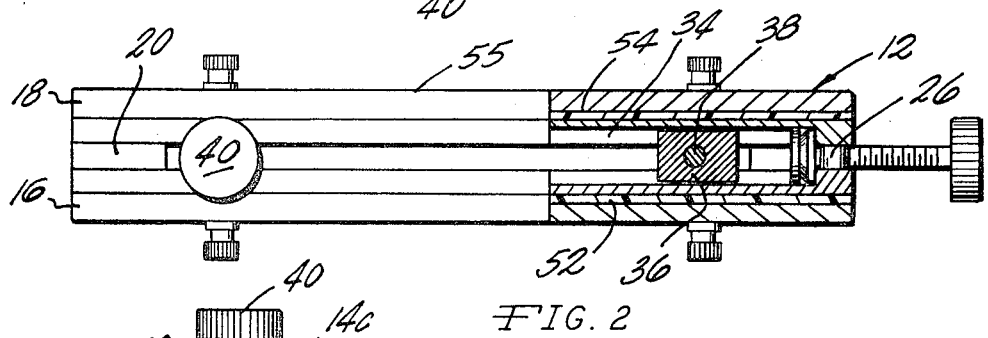
Figure 3:
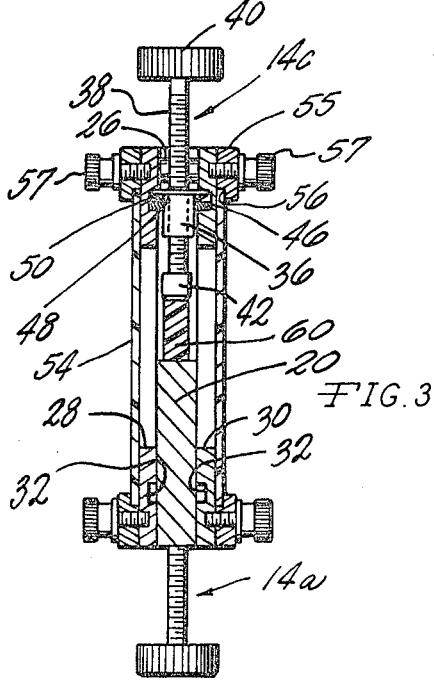
Figure 4:
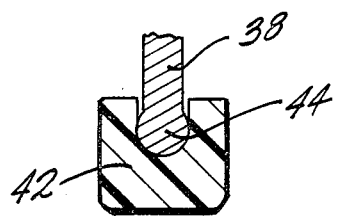

Further objects, features and advantages of this invention will become apparent from a consideration of the following description, the appended claims, and the accompanying drawing in which:

FIG. 1 is a side elevational view of the apparatus of this invention illustrating a structural member supported and loaded as a cantilever beam;

FIGS. 2 and 3 are sectional views of the apparatus of this invention as seen from the lines 2—2 and 3—3, respectively; and FIG. 4 is an enlarged fragmentary sectional view of the load applying end of one of the support and load applying units in the apparatus of this invention.

With reference to the drawing, the apparatus of this invention, indicated generally at 10, is illustrated in FIG. 1 as consisting of a hollow frame 12 on which a plurality of support and load applying units 14a–e, inclusive, illustrated as being five in number, are movably mounted. The frame 12 consists of four identical side frame members 15 and four identical end frame members 17 assembled to form a pair of rectangular plates 16 and 18 which are arranged in a side-by-side relation in spaced-apart substantially parallel planes. At one end of the frame 12, a generally L-shape member 20 (which can be formed from a single piece or from a pair of pieces) is positioned between the plates 16 and 18 and nut and bolt assemblies 22 are extended through the plates 16 and 18 and the member 20 so as to clamp the member 20 between the plates. The member 20 thus functions to maintain the plates 16 and 18 in a spaced-apart relation. At the opposite end of the frame 12, similar nut and bolt assemblies 24 connect the plates 16 and 18 and have spacers 26 mounted thereon and positioned between the plates 16 and 18 so as to maintain the plates in the desired spaced-apart relation.

The frame members 15 and 17 cooperate to provide the frame 12 with aligned rectangular window openings 28 and 30, respectively, and each of the members 15 and 17 is formed with an internal groove 32. The grooves 32 cooperate to form a generally rectangular track 34 extending about the periphery of the openings 28 and 30 and in which a plurality of T-nuts 36 are slidably mounted, each nut 36 being provided for one of the load supporting units 14.

A load supporting unit 14 includes, in addition to a nut 36, a screw member 38 which is threadably supported in the nut 36 and provided on one end with a knurled head 40 and on the opposite end with a load transmitting block 42. As shown in FIG. 4, each screw 38 terminates in a ball-shape end portion 44 and the block 42, which is formed of a plastic material having low coefficient of friction characteristics, is rotatably supported on the ball 44, for a purpose to appear presently. Each unit 14 also includes a nylon washer 46 slidably supported in the track 34 and a spring washer 50 which extends between the head 48 of the nut 36 and the washer 46.

Circular polarizer panels 52 and 54 are mounted on the plates 16 and 18, respectively, so that the panels 52 and 54 overlie the window openings 28 and 30, respectively. The purpose of the panels 52 and 54 has been previously explained. The panels 52 and 54 are retained on the frame 12 by polarizer guide and clamp plates 55, each of which has an undercut inside groove 56 shaped to accommodate one edge of a polarizer panel. Clamping screws 57 are threaded into the frame 12 to retain the plates 55 in positions holding the polarizer panels in position on the frame. By loosening the screws 57, the panels can be slid out of the grooves 56.

In the use of the apparatus 10, a structural member 60, formed of a photoelastic material, is floatingly positioned within the hollow frame 12. By "floatingly" is meant the member 60 is maintained in a spaced relation with the frame 12. By virtue of the provision of a plurality of load applying units 14, the member 60 can be supported in any one of a large number of floating positions. As shown in FIG. 1, the member 20 has a pair of mutually perpendicular surfaces 62 and 64 and the structural member 60 can be engaged with either, both, or neither of these surfaces 62 and 64. In the cantilever beam supported position of the member 60 illustrated in FIG. 1, the member 60 is positioned so that one end is supported on the surface 62 and the load applying unit 14e is advanced into engagement with the member 60 so as to clamp it against the surface 62. When the screw 38 for the unit 14e is rotated, by manipulation of the head 40 so as to advance the block 42 into engagement with the beam 60, the rotatable support of the block 42 on the screw 38 prevents turning friction of the screw 38 from being transmitted to the beam 60. Thus, the desired loading of the beam 60 can be accomplished without frictional complications.

In the use of the apparatus 10, assume that the stress and strain analysis of a conventional cantilever beam is to be undertaken. The units 14a, 14b and 14c are retracted so as to be inoperative, one end of the beam is clamped against the surface 62 by manipulation of the unit 14e (FIG. 1), and the unit 14d is advanced into engagement with the free end of the beam 60 so as to bend the beam 60 downwardly. This results in an isochromatic band pattern like the pattern shown at 66 in FIG. 1 being visible through either of the light polarizing panels 52 and 54. In the event that it is desired to load the member 60 as a column, the unit 14c is moved to a position in which it engages the member end surface 68 prior to retracting the units 14a, b, c, and d. It is readily apparent to those skilled in the art that a large variety of loadings can be thus accomplished so long as reasonable care is taken not to completely unload the member 60 at any time and allow it to drop in the frame 12 from a floating position.

From the above description it is seen that this invention provides apparatus which is compact, of a size that it can readily be held in the hand or supported on a table on a pair of screw heads 40 and used to demonstrate stress patterns 66 in a structural member 60. A variety of structural members 60 can be used in the apparatus 10 and by virtue of the fact that a plurality of load applying units 14 are provided, one of which is at all times alignable with the surface 62 and another of which is at all times alignable with the surface 64, a wide variety of loading conditions on the beam 60 can be simulated to thereby demonstrate the correspondingly varying stress patterns 66 in the structural member 60.

What is claimed is:

1. Apparatus for visually demonstrating stress patterns in a structural member formed of a photoelastic material, said apparatus comprising means forming a hollow frame having a pair of window openings therein, a pair of light polarizing panels mounted on said frame so as to cover said window openings, track means on said frame, and adjustable support and load applying units movably mounted and guided on said track means, each of said units comprising nut means slidably mounted on said track means so as to be non-rotatable with respect to said frame, and screw means threadably supported in said nut means for engagement with a structural member disposed within said hollow frame and between said panels, said units being capable of applying variable loads to a member within said frame so as to visually demonstrate varying stress patterns in the member to a viewer observing the member through said panels.

2. Apparatus according to claim 1 further including a structural member engaging block rotatably mounted on said screw means for engagement with a structural member disposed within said frame.

3. Apparatus for visually demonstrating stress patterns in a structural member, said apparatus comprising a hollow frame, said frame including means forming connected plates arranged in a spaced-apart side-by-side relation in substantially parallel planes, said plates having a pair of window openings therein arranged in a substantially aligned relation, means on said plates forming a track within said frame extending at least partially around the peripheries of said window openings, nuts mounted in said track for sliding non-rotatable movement partially about the peripheries of said window openings, a structural member formed of a photoelastic material and disposed in a position spaced from said plates and between said window openings, screw means supported in said nuts and advanceable therethrough into engagement with said structural member for applying a load thereto, and light polarizing panels mounted on said plates in positions covering said window openings.

4. Apparatus according to claim 3 further including structural member support means positioned between said window openings and attached to said plates for engagement with said structural member so as to constitute a support therefor.

5. Apparatus according to claim 4 wherein said support means has mutually perpendicular support surfaces on either of which said structural member can be supported.

6. Apparatus according to claim 5 wherein at least one of said nuts is movable on said track to a position in which the screw means advanceable therethrough is alignable with one of said support surfaces and another one of said nuts is movable to a position on said track to a position in which the screw means advanceable therethrough is alignable with the other one of said support surfaces.

7. Apparatus according to claim 3 further including a block member mounted on each of said screw means and located within said frame for rotatable movement relative to said screw means, said block member being engageable with said structural member for transferring load thereto without transmitting turning friction of said screw means to said structural member.

* * * * *